April 12, 1932.  W. F. NEWHOUSE  1,853,633
STAPLING MACHINE
Filed July 29, 1929  6 Sheets-Sheet 1

Inventor
Walter F. Newhouse
By Arthur F. Durand
Atty.

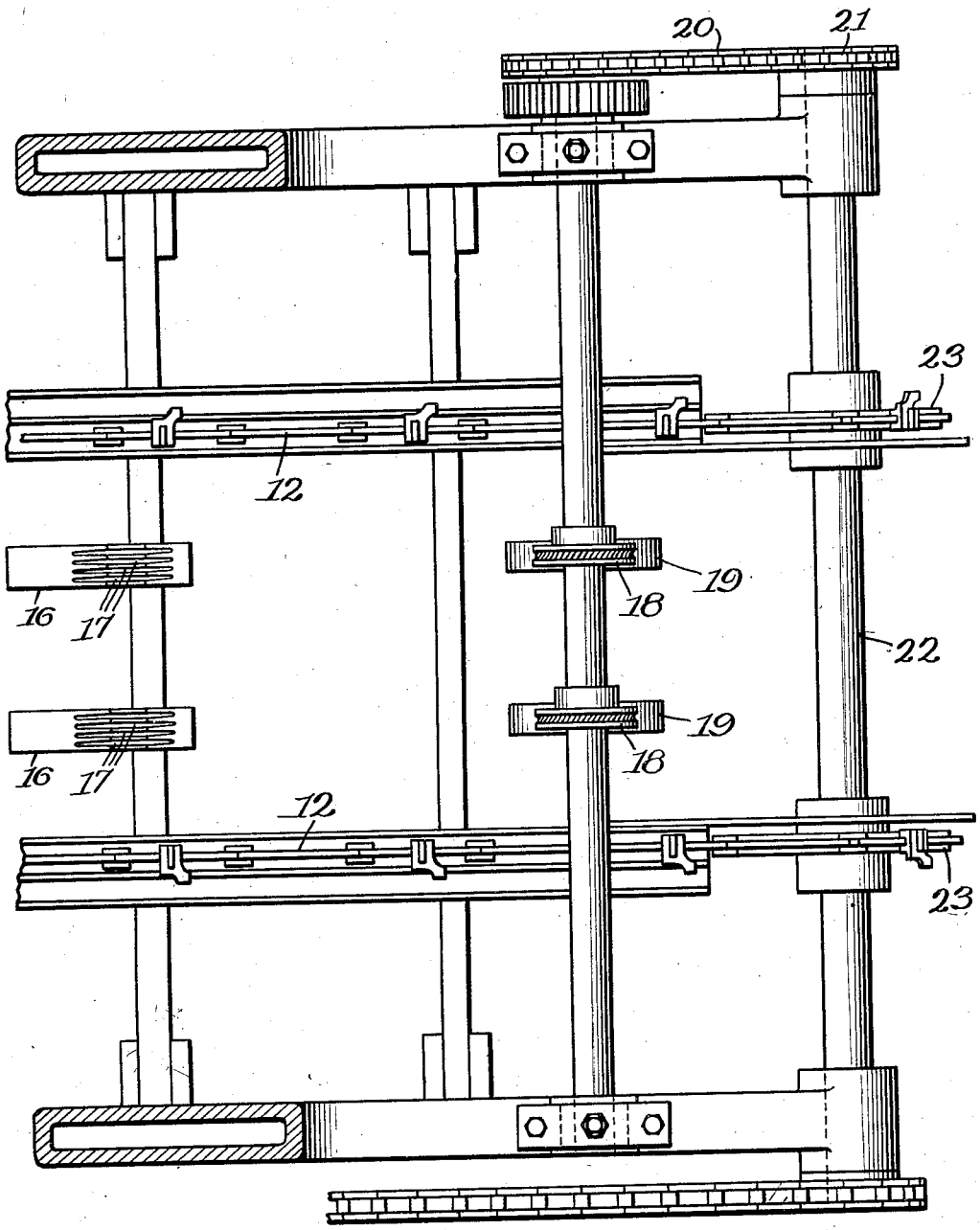

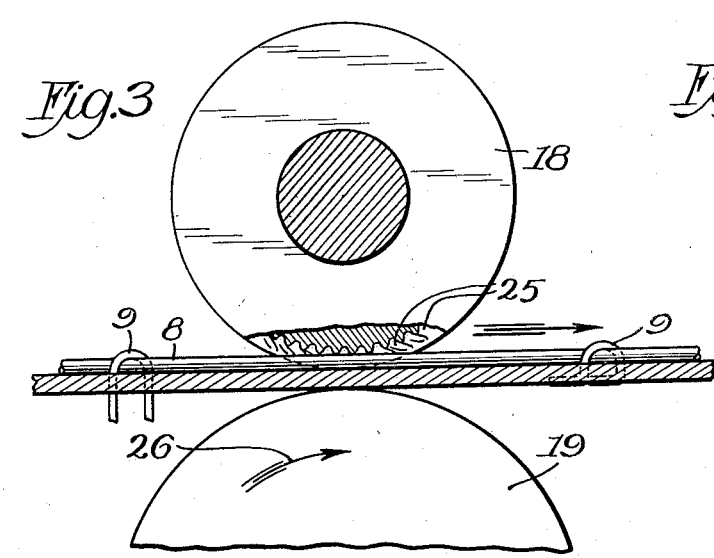
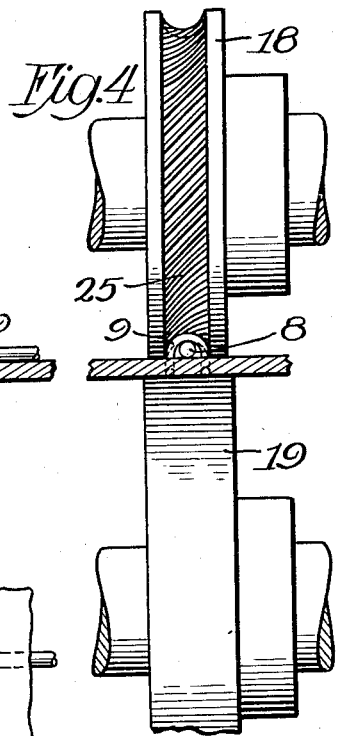
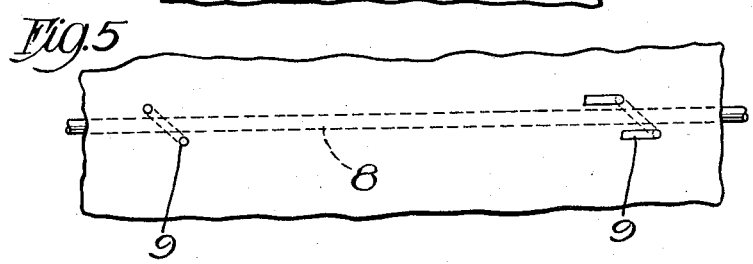
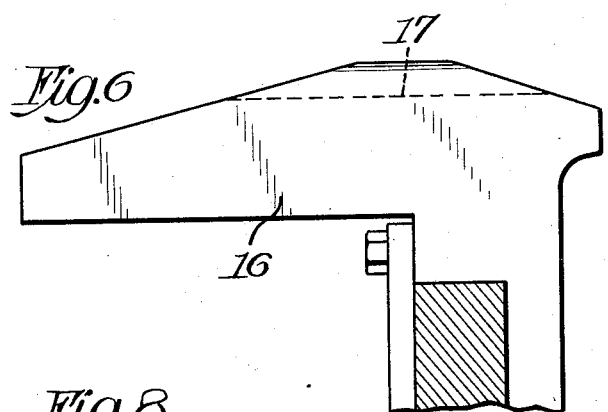
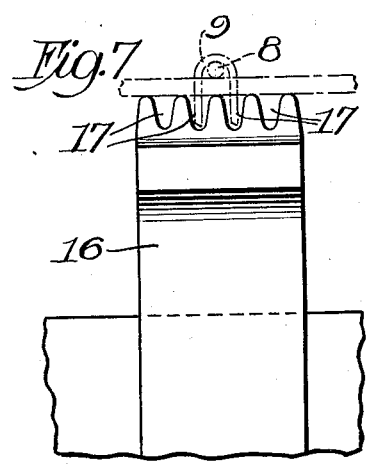
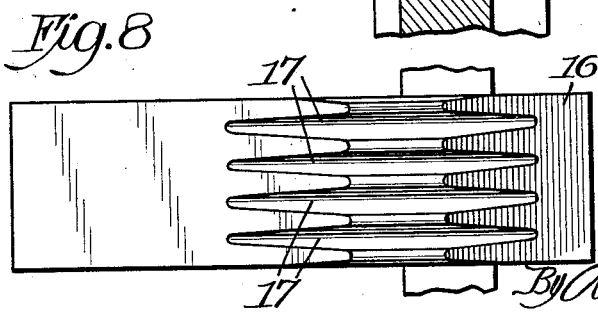

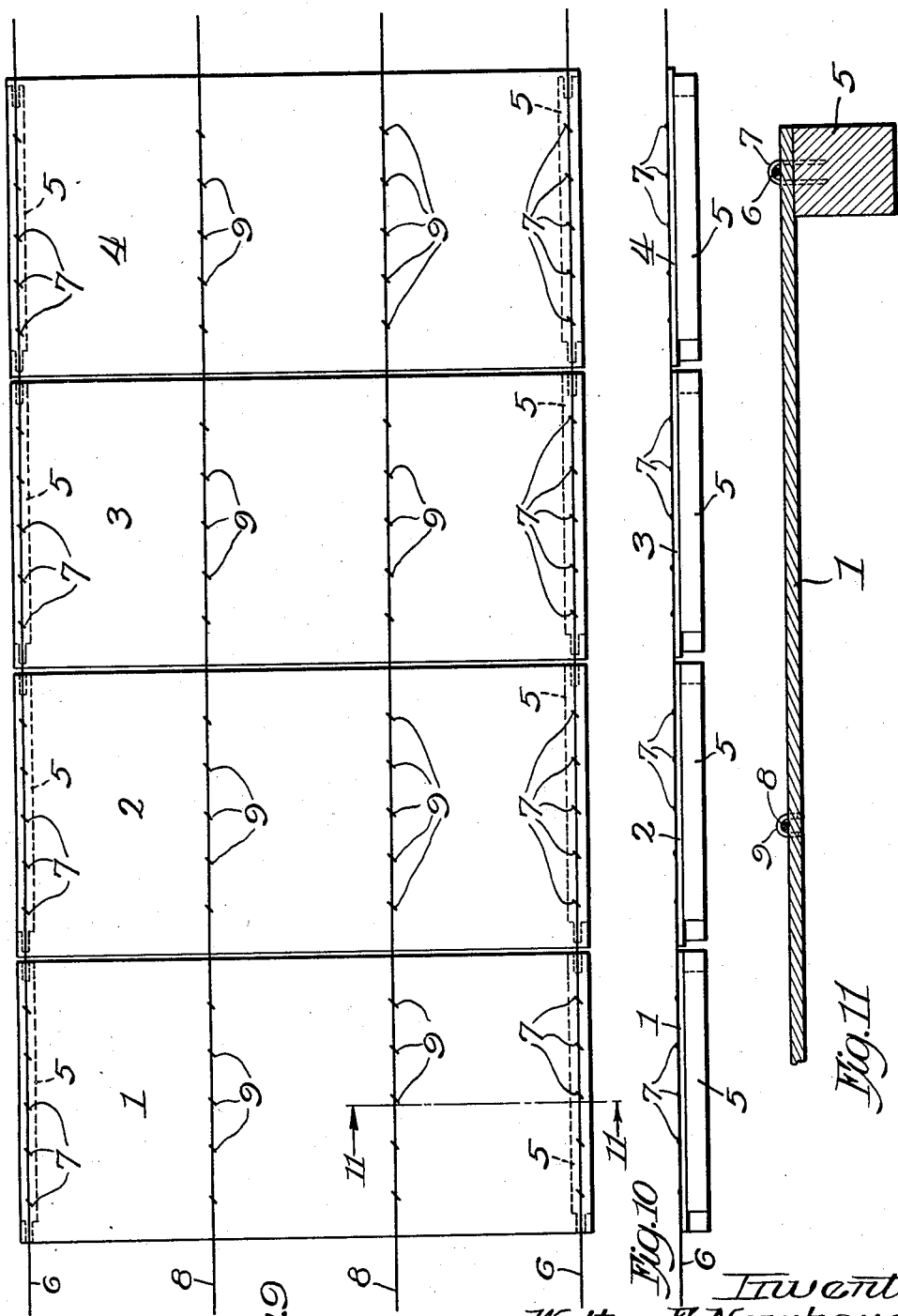

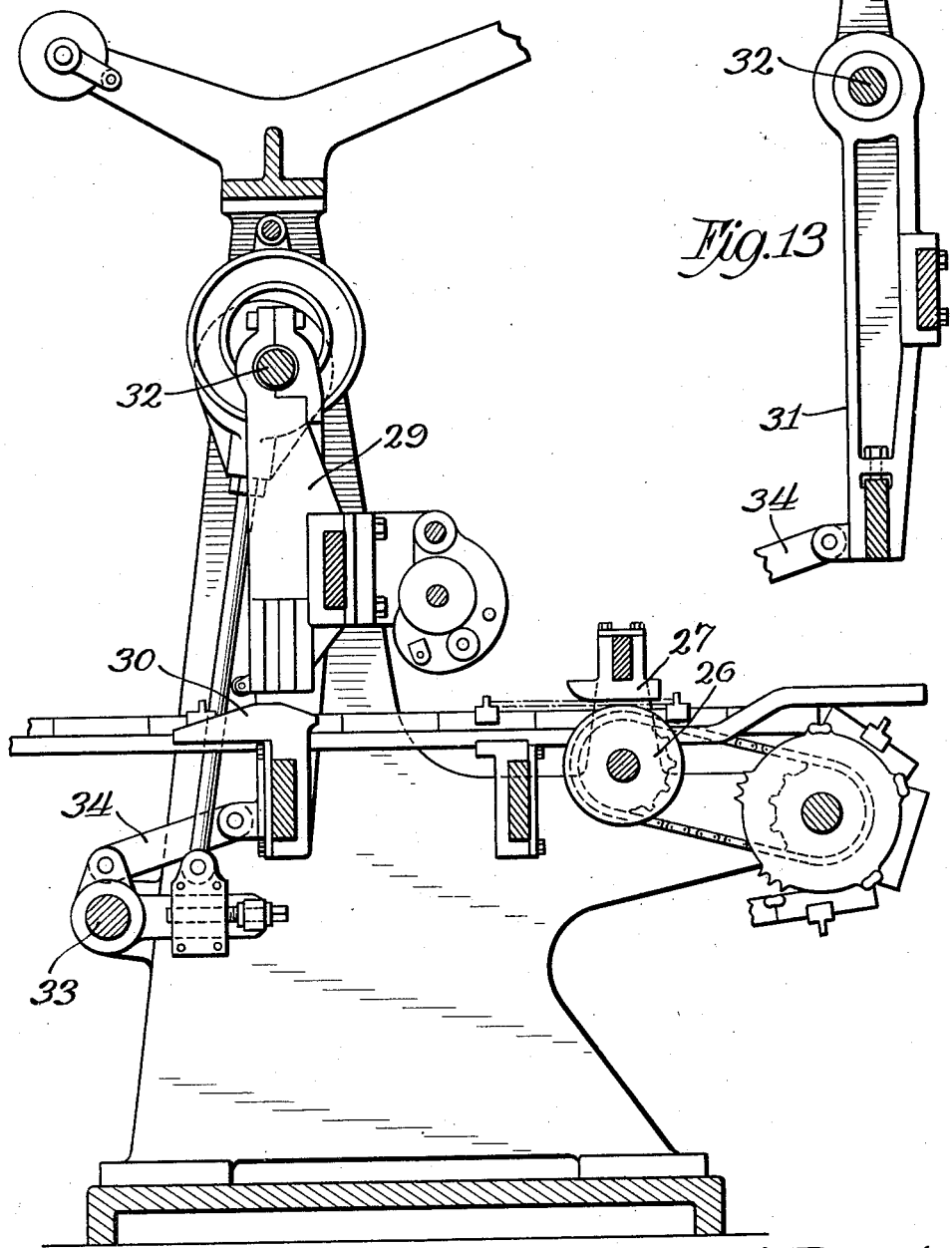

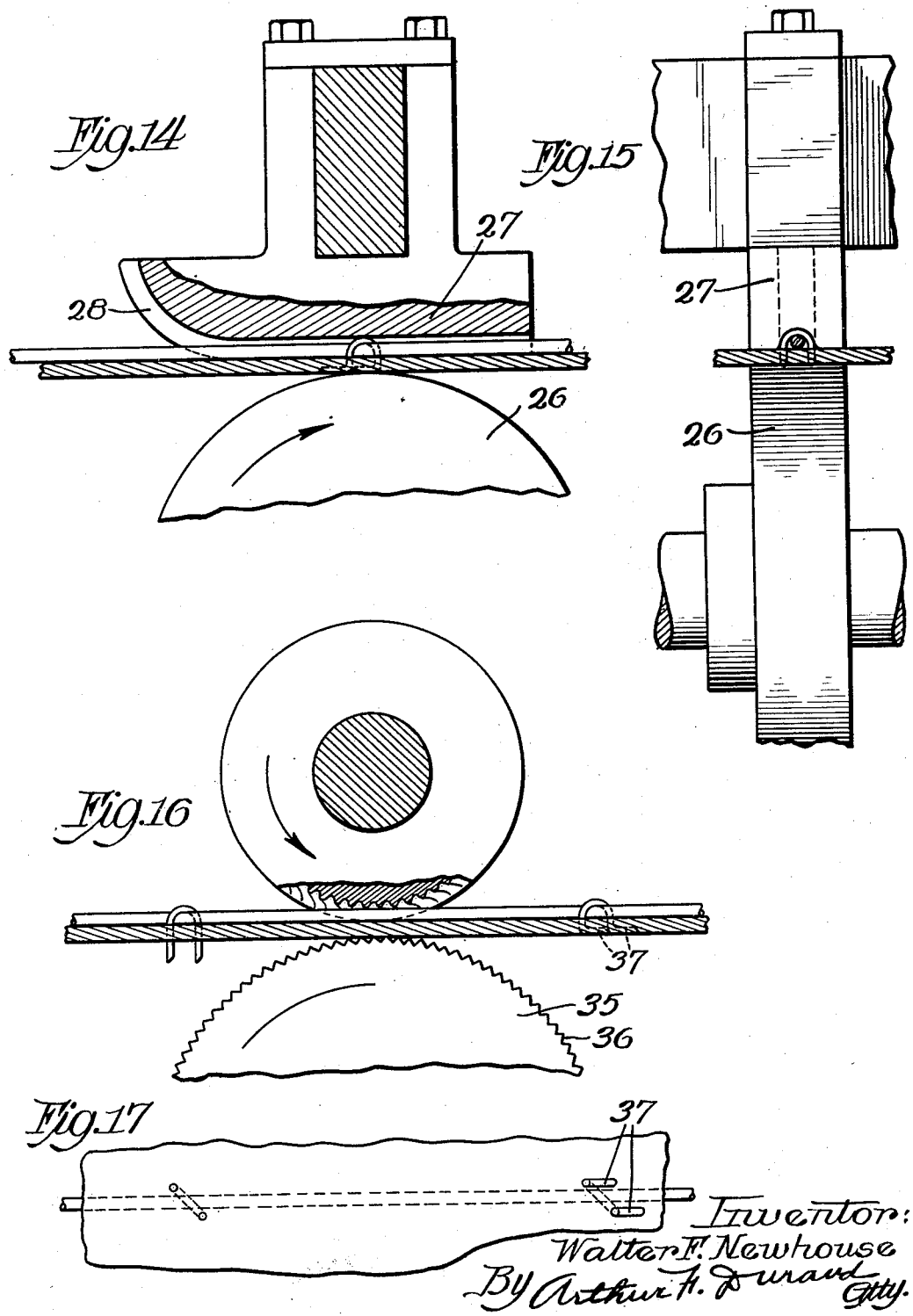

Patented Apr. 12, 1932

1,853,633

UNITED STATES PATENT OFFICE

WALTER FREDERICK NEWHOUSE, OF BENTON HARBOR, MICHIGAN, ASSIGNOR TO SARANAC AUTOMATIC MACHINE CORPORATION, OF BENTON HARBOR, MICHIGAN, A CORPORATION OF DELAWARE

STAPLING MACHINE

Application filed July 29, 1929. Serial No. 382,022.

This invention relates to machinery for stapling materials together, and more particularly to machines of this kind for making wire bound box blanks.

Generally stated, the object of the invention is to provide a novel and improved machine whereby the staples are first driven into the work, and through materials, without clinching the ends of the staples, whereby the unclinched staple points are thereafter clinched or flattened against the under side of the materials, thereby to insure clinched staple ends which will not project from the surface of the materials.

It is also an object to provide certain details and features of construction and combinations tending to increase the general efficiency and the desirability of a stapling machine of this particular character.

To the foregoing and other useful ends, the invention consists in matters hereinafter set forth and claimed and shown in the accompanying drawings, in which—

Fig. 2 is a horizontal section on line 2—2 in Fig. 1;

Fig. 3 is an enlarged detail sectional view showing the staple-clinching means;

Fig. 4 is a side elevation or edge view of the elements shown in Fig. 3 of the drawings;

Fig. 5 is an underneath plan view of the section of work shown in Fig. 3 of the drawings;

Fig. 6 is an enlarged side elevation of the work support upon which the work is supported while the staples are being inserted;

Fig. 7 is an edge view or side elevation of the support shown in Fig. 6 of the drawings;

Fig. 8 is a plan view of the elements shown in Fig. 6 of the drawings;

Fig. 9 is a plan view of the wire bound blank of the kind made on said machine;

Fig. 10 is a side elevation or edge view of said blank; and

Fig. 11 is an enlarged detail section on line 11—11 in Fig. 9 of the drawings.

Fig. 12 is a view similar to Fig. 1, showing a different form of the invention.

Fig. 13 is a detail view of a portion of the machine shown in Fig. 12 of the drawings.

Fig. 14 is a view similar to Fig. 3, showing a different form of the invention.

Fig. 15 is a side elevation of the parts shown in Fig. 14 of the drawings.

Fig. 16 is a view similar to Fig. 3, showing a different form of the invention.

Fig. 17 is a fragmentary view of a portion of the blank shown in Fig. 16 of the drawings.

Figure 1:
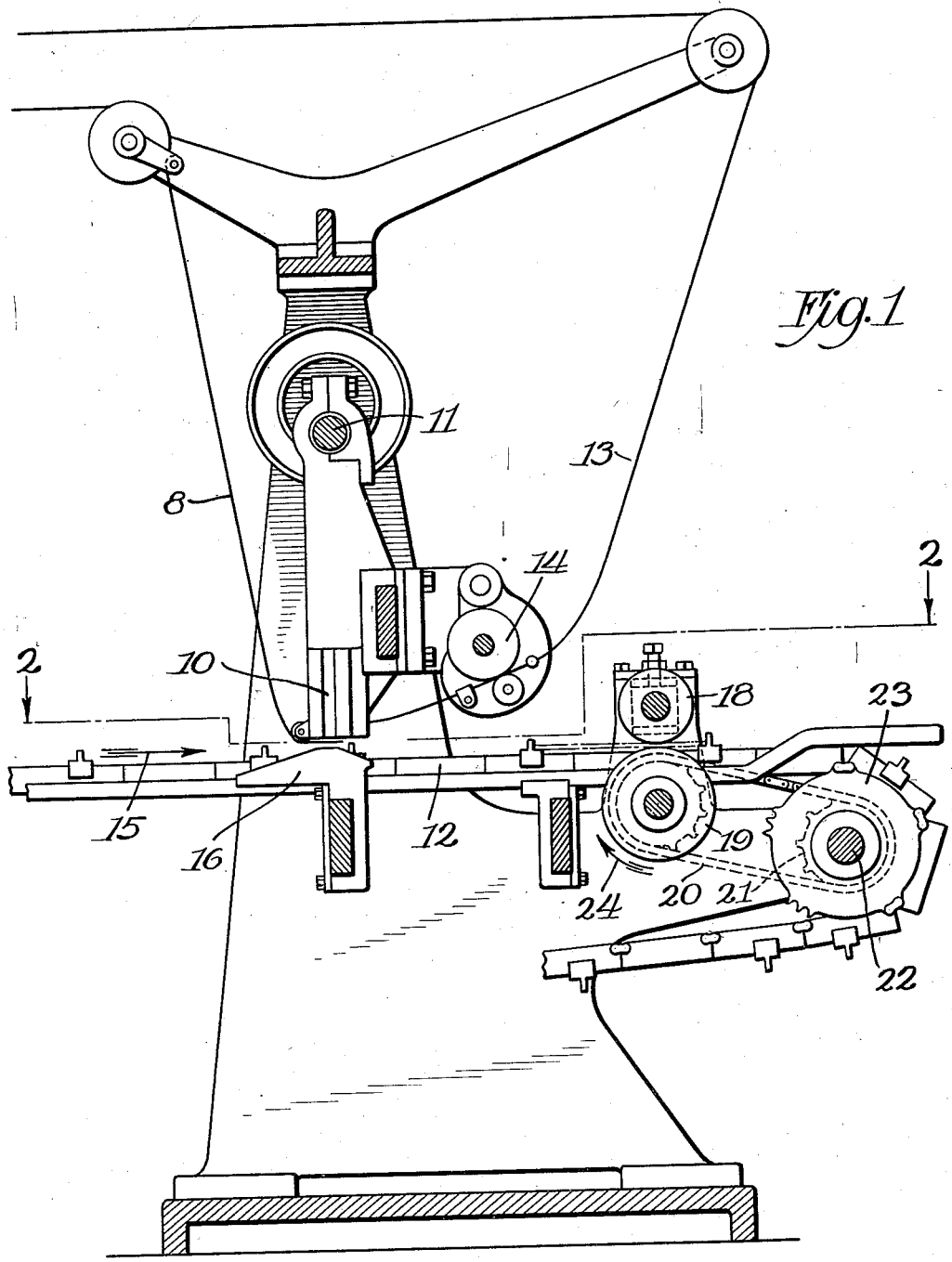
Fig. 1 is a longitudinal section of a stapling machine embodying the principles of the invention.

As thus illustrated, the work to be stapled comprises a wire bound box blank having four sections 1, 2, 3 and 4 of wood veneer or other sheet material, each section having cleets 5 secured to the edges thereof, along the side edges of the blank. The binding wires 6 and 6 are stapled to the sheets and cleets by means of the staples 7, as shown, and the two middle binding wires 8 are simply stapled to the sheets by means of the staples 9, as shown, the points or ends of the staples 9 being clinched against and preferably into the lower side of the sheets, whereby the staple points or end portions are flush with the under surface of the sheets.

The machine for producing wire bound blanks of the kind shown and described comprises a suitable stapler 10 operated by the shaft 11 in any suitable or desired manner. The sheets and cleets are carried along by endless link belts 12 in the well known manner, preferably by intermittent motion, and the staples are driven at the desired or predetermined points in the work. The staple wire 13 is fed by the feed rolls 14 to the staplers, there being a separate stapler and a wire feeding device for each of the four binding wires of the blank. The work is thus fed along in the machine, under the staplers, in the direction indicated by the arrow 15 in Fig. 1 of the drawings.

The two work supports 16 are disposed in position below the work, in line with the wires 8 and 8, and these supports are provided with depressions or grooves 17 to receive the points or end portions of the staples, as indicated in Fig. 7 of the drawings. In this way, these staples 9 are inserted without causing their points or end portions to be clinched against the under side of the work.

Thereafter the blank sections pass between the upper and lower rollers 18 and 19, the roller 19 being connected by a sprocket chain 20 with a sprocket 21 on the shaft 22, upon which latter are mounted the sprockets 23 for the link belts 12, previously mentioned. In this way, the roller 19 is rotated in the direction indicated by the arrow 24 in Fig. 1 of the drawings, and its surface speed is preferably the same as the speed of travel of the blank. The upper roller 18 is provided with peripheral grooves 25, disposed in an angle as shown, to engage the tops of the staples 9, so that these staples will not be mashed or injured. However, the smooth periphery of the lower roller 19 engages the staple points or ends and forces them backward and upward into the sheet material, as shown in Figs. 3 and 4 of the drawings, and as shown at the right in Fig. 5 of the drawings, the legs of the staples being bent back parallel with each other and forced into the wood or other soft material from which the sheets or sections of the blank are made. It will be seen that there is a pair of clincher rollers 18 and 19 for each binding wire 8 and there will be as many of these pairs as there are binding wires that are not stapled to cleets. The staples 7 are driven into the cleets 5, of course, and need no clinching means; but the staples 9, that are driven obliquely over the binding wires 8, require clinching means of some kind to clinch the points or ends of the staples and this is effectively done in the manner and by the means shown and described.

Ordinary staplers, of course, have anvils or clinch blocks for clinching the ends or points of the staples, at the same time the staples are driven. However, this method has been found to be more or less unsatisfactory, as it does not insure a smooth clinch for the staples, and in many cases the points or end portions of the staples are left projecting more or less in a dangerous manner from the surface of the materials. However, with the machine and the method shown and described, involving the insertion of the staples first without clinching their points or ends, and the subsequent clinch or flattening of the end portions of the legs of the staple against and preferably into the wood veneer or other materials, a perfectly smooth stapling job is insured, free from projecting staple portions on the under side of the work.

The roller 19 may rotate, as explained, at the same speed as the work, or it may rotate faster than the work. Also, the roller 19 may even rotate in the opposite direction, if desired, and the circumstances are such that this method may insure better results than when the roller rotates in the direction indicated by the arrow 26 in Fig. 3 of the drawings. Preferably, and especially so when wood veneer is employed, the staples 7 and 9 are all inserted obliquely, as shown, as the grain of the wood will run at right angles to the binding wires, and in this way the staples will be driven transversely of the grain of the wood, thereby insuring a stronger anchoring of the staple in the materials.

While the product of the machine shown and described is a wire bound box blank, it is obvious that the invention is not limited to any particular product, as this method of inserting the staples and thereafter clinching their points or ends may be employed in the production of other stapled products, as well as the production of wire bound box blanks, without departing from the spirit of the invention.

As shown in Figs. 12, 13, 14 and 15 of the drawings, the staples are clinched by the roller 26, and the stationary member 27 bears down upon the blank, having its lower engaging surface provided with a groove or channel 28 to receive the wire and staples. Also, as shown in Figs. 12 and 13, the staplers 29 and the members 30 (the latter being similar to the member 16 previously described) are supported by a swinging frame 31, which swings about the operating shaft 32 as an axis, whereby the staplers and the members 30 travel a distance with the blank, during the actual insertion of the staples. The frame 31 is actuated back and forth by a rock shaft 33, through the medium of the link 34, as shown.

In Figs. 16 and 17, the construction is similar to that shown in Fig. 3 of the drawings, but in this case the lower roller 35 has a serrated periphery 36 and is rotated in the direction of the moving blank, but at greater speed. In this way the staple points 37 are bent forward, instead of backward, as shown at the right in Figs. 16 and 17 of the drawings.

The members 16 and 30, it will be seen, are formed to support the veneer or other sheet material in such a manner as to prevent fracture thereof by the pressure of the staplers. For example, the support could be provided with a round hole to receive both points of the staple, but that would leave the veneer or sheet material unsupported between the points of the staple, with the result that fracture of the veneer or sheet material would be liable to occur, as a result of the impact of the stapling mechanism. However, with the supports 16 and 30 formed as shown, the veneer or sheet material is supported not only at opposite sides of the staple, but also between the points of the staple, as shown in Fig. 7 of the drawings, and, with this construction, fracture of the veneer or sheet material is avoided.

The stapling support 16, it will be seen, engages the blank directly under the binding wire, and the blank slides on this support, but the grooves 17 prevent clinching of the staple points, as they move toward the clinching mechanism by which the staple points are clinched in the manner shown and described. The points can be deflected in either direction, as indicated, as may be desired.

It will be understood, of course, that the purpose of the invention is to initially insert the staples in such a manner that their points are at least not fully clinched, and whereby in a subsequent operation the points or ends are pressed against and into the surface of the materials.

What I claim as my invention is:

1. In a stapling machine for stapling materials, the combination of a stapling support adapted to permit insertion of the staples through the work without clinching the points of the staples, and suitable clinching mechanism disposed in position and operative to subsequently clinch the points of the staples against the adjacent surface of the materials, said clinching mechanism comprising an upper grooved member to receive the heads of the staples, and comprising a lower roller having its periphery formed to bend the end portions of the staples against the under side of the materials.

2. In a stapling machine for stapling materials, the combination of a stapling support adapted to permit insertion of the staples through the work without clinching the points of the staples, and suitable clinching mechanism disposed in position and operative to subsequently clinch the points of the staples against the adjacent surface of the materials, said stapling support comprising a member having parallel grooves therein to receive the ends of the staples, supporting the materials between the points of each staple, preventing the staple ends from being clinched, and preventing fracture of the materials by the impact of the stapling machine.

3. In a stapling machine for stapling materials, the combination of a stapling support adapted to permit insertion of the staples through the work without clinching the points of the staples, and suitable clinching mechanism disposed in position and operative to subsequently clinch the points of the staples against the adjacent surface of the materials, comprising means to feed a binding wire on to said materials in position to be secured thereto by said staples, said mechanism comprising an upper member formed to bear upon the materials at each side of said binding wire, and including lower means cooperating with said member to clinch the staples.

4. In a stapling machine for stapling materials, the combination of a stapling support adapted to permit insertion of the staples through the work without clinching the points of the staples, and suitable clinching mechanism disposed in position and operative to subsequently clinch the points of the staples against the adjacent surface of the materials, comprising a stapler, said support being mounted in fixed relation to the stapler, and means whereby the stapler and said support move back and forth in unison, and means for feeding the work with a continuous motion, whereby the stapler and said support move a distance with the work each time a staple is being inserted therein.

5. In a stapling machine for stapling materials, the combination of a stapling support adapted to permit complete insertion of the staples through the work without fully clinching the points of the staples, and suitable clinching mechanism disposed in position and operative to subsequently clinch the points of the staples against the adjacent surface of the materials, said mechanism comprising an upper grooved member to receive the heads of the staples, and comprising a lower roller having its periphery formed to bend the end portions of the staples against the under side of the materials.

6. In a stapling machine for stapling materials, the combination of a stapling support adapted to permit complete insertion of the staples through the work without fully clinching the points of the staples, and suitable clinching mechanism disposed in position and operative to subsequently clinch the points of the staples against the adjacent surface of the materials, said stapling support comprising a member having parallel grooves therein to receive the ends of the staples, supporting the materials between the points of each staple, preventing the staple ends from being clinched, and preventing fracture of the materials by the impact of the stapling machine.

7. Staple clinching mechanism for wire bound box blank machinery, comprising a lower supporting roll disposed in position to provide a support for the blank directly under the binding wire, and an upper roll engaging the top of the blank directly above said supporting roll, said upper roll having a peripheral channel, and the bottom of said channel being cross-grooved to receive the heads of the staples.

8. A structure as specified in claim 7, said lower roll being driven.

9. Staple clinching mechanism for wire bound box blank machinery, comprising a lower supporting roll disposed in position to engage the under side of the blank directly under the binding wire, and an upper member disposed in position to bear upon the blank at each side of the binding wire, said member being channeled on its face to receive the binding wire and staple heads.

10. A structure as specified in claim 9, said upper member being formed to engage and bear upon the heads of the staples.

11. A structure as specified in claim 9, said roll being formed to bend the staple points flush with the under side of the blank.

12. A structure as specified in claim 9, and means for feeding the blank material forward with a continuous motion.

Specification signed this 25th day of July, 1929.

WALTER FREDERICK NEWHOUSE.